United States Patent
Nakazawa

(10) Patent No.: US 6,410,921 B1
(45) Date of Patent: *Jun. 25, 2002

(54) X-RAY IMAGE RECORDING SYSTEM AND X-RAY IMAGE RECORDING METHOD

(75) Inventor: Masayuki Nakazawa, Hino (JP)

(73) Assignee: Konica Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/239,436

(22) Filed: Jan. 28, 1999

(30) Foreign Application Priority Data

Jan. 30, 1998 (JP) .............................. 10-019597

(51) Int. Cl.$^7$ ................................. G01T 1/00
(52) U.S. Cl. .............................. 250/370.09; 250/208.1; 378/98.8
(58) Field of Search ..................... 378/98.8, 9; 348/222, 348/342, 606, 625, 671, 686, 294, 297; 358/530, 455, 454, 448; 250/370.09, 587, 208.1

(56) References Cited

U.S. PATENT DOCUMENTS 4,317,179 A * 2/1982 Kato et al. ................. 364/515
5,151,947 A * 9/1992 Nagatsuka et al. ............. 382/6
5,396,072 A * 3/1995 Schiebel et al. ....... 250/370.09
5,493,622 A * 2/1996 Tsuchino et al. ........... 382/132

FOREIGN PATENT DOCUMENTS

| JP | 62-62373 | 12/1987 |
| JP | 6-342098 | 12/1994 |
| JP | 9-90048 | 4/1997 |

* cited by examiner

Primary Examiner—Robert H. Kim
Assistant Examiner—Hoon K. Song
(74) Attorney, Agent, or Firm—Frishauf, Holtz, Goodman & Chick, P.C.

(57) ABSTRACT

A radiation image reading apparatus is provided which includes a semiconductor detector for converting radiation photons penetrated through a subject into electric signals to generate first radiation image information, and a processor for processing the first radiation image information. The processor processes the first radiation image information so that a modulation transfer function in a low density region is not higher than a modulation transfer function in a high density region, in order to generate second radiation image information. The semiconductor detector includes a substrate, a plurality of electrodes, capacitors, switching elements, a photoconductive layer and a surface electrode, which are fabricated on the substrate.

12 Claims, 14 Drawing Sheets

AN EXAMPLE OF THE STRUCTURE OF THE X-RAY IMAGE READING SYSTEM 100 USED IN EACH EXAMPLE

AN EXAMPLE OF THE STRUCTURE OF FPD4

AN EXAMPLE OF THE STRUCTURE OF A CELL OF FPD4

AN EXAMPLE OF AN X-RAY IMAGE OF THE CHEST OF THE HUMAN BODY

AN EXAMPLE OF THE HISTOGRAM OF THE ORIGINAL IMAGE SIGNAL Sorg

AN EXAMPLE OF RELATIONSHIP BETWEEN THE ORIGINAL IMAGE SIGNAL Sorg AND THRESHOLD VALUES $A_1$, $A_2$, AND $A_3$ THE RELATIONSHIP BETWEEN THE ATTENUATION COEFFICIENT $\alpha$ AND THE UNSHARP MASK SIGNAL Sus CHARACTERISTIC VIEWS SHOWING A CORRECTION
METHOD OF THE ORIGINAL IMAGE SIGNAL Sorg AN EXAMPLE FOR OBTAINING THE MAXIMUM VALUE Smax AND MINIMUM VALUE Smin OF Sorg FROM THE ACCUMULATION HISTOGRAM AN EXAMPLE OF CHANGEABILITY OF THE ATTENUATION COEFFICIENT $\alpha$ (PART 1)

AN EXAMPLE OF CHANGEABILITY OF THE
ATTENUATION COEFFICIENT α (PART 2)

AN EXAMPLE OF A CASE USING 2 ATTENUATION COEFFICIENTS $\alpha_1$ AND $\alpha_2$

AN EXAMPLE OF THE MODULATION TRANSFER FUNCTION TO THE FREQUENCY CHARACTERISTIC IN A CASE USING ATTENUATION COEFFICIENTS $\alpha_1$ AND $\alpha_2$ (PART 1)

AN EXAMPLE OF THE MODULATION TRANSFER FUNCTION TO THE FREQUENCY CHARACTERISTIC IN A CASE USING ATTENUATION COEFFICIENTS $\alpha_1$ AND $\alpha_2$ (PART 2)

AN EXAMPLE OF THE CHANGEABILITY IN A CASE USING A PLURALITY OF ATTENUATION COEFFICIENTS $\alpha 1$, $\alpha 2$, $\alpha 3$, AND $\alpha 4$

X-RAY IMAGE RECORDING SYSTEM AND X-RAY IMAGE RECORDING METHOD

BACKGROUND OF THE INVENTION

The present invention relates to a radiation image reading system and a radiation image reading method which are appropriate for use in a medical radiographic system to obtain a radiation image, such as an x-ray image, penetrated through the chest of the human body or the like. More specifically, the present invention relates to a reading system and method in which a semiconductor detecting means for converting radiation photons penetrated through the subject into an electric signal is provided, and wherein when the radiation image of the subject is reproduced as a visual image, an image signal obtained from the semiconductor detecting means is processed so that graininess is improved in the low density area of the radiation image, while sharpness is maintained in the high density area.

In many cases, radiographic systems can be used for both medical and industrial applications. In the medical X-ray photographic system, such a radiation image processing apparatus is used that a storage phosphor material (photostimulable phosphor material) is used as an intermediate medium, an X-ray image is recorded therein, the X-ray image is read out and reproduced, and recorded in the recording material as a final image.

A technological document relating to this type of the radiation image processing apparatus has been disclosed in Japanese Patent Publication No. 62373/1987. In the disclosed radiation image processing apparatus, a storage phosphor is used for detecting the X-ray image signal. When an X-ray is irradiated onto the storage phosphor, energy corresponding to the exposure is accumulated therein, and when a light beam with a specific wavelength (a laser light, or the like) is irradiated, luminescence corresponding to the accumulated energy is emitted.

According to the X-ray image processing apparatus utilizing the storage phosphor, by irradiating the X-ray onto the storage phosphor through a subject, the X-ray image of the subject is accumulated in the storage phosphor for recording. Further, when an excitation light scans on the storage phosphor in which the X-ray image is recorded, the photostimulated luminescence, generated from the storage phosphor by the excitation light, is converged and then converted into an electric signal by means of a photo-electric conversion device such as a photomultiplier, etc.

An original image signal read from the storage phosphor is defined as "Sorg". The spatial frequency which is important for diagnosis exists in a spatial frequency area having a relatively low image density (hereinafter, referred to as the low spatial frequency component), though there are some amount of differences depending on each part of the human body. Consequently, unsharp mask processing is conducted such that the low spatial frequency component is emphasized so that the contrast is enhanced.

For example, an unsharp mask signal Sus corresponding to the ultra low spatial frequency component is obtained at each scanning point on the storage phosphor. Herein, when an emphasizing coefficient is β and a reproduction image signal is S', the emphasizing coefficient β is monotonously increased corresponding to an increase of values of an original image signal Sorg or the unsharp mask signal Sus, and the calculation is conducted by using the following arithmetic expression:

$$S'=Sorg+\beta(Sorg-Sus) \quad (1)$$

According to this calculation, the reproduction image signal S' can be obtained such that the low spatial frequency component and a higher spatial frequency component which relate to the X-ray image of the subject, are emphasized.

However, in the X-ray image reading system using the storage phosphor, a means for irradiating the excitation light beam onto the storage phosphor in which the X-ray image has been recorded, a means for scanning by using the excitation light beam, means for converging the stimulated luminescence generated from the storage phosphor and then converting it into an electric signal, and a means for erasing the remaining image, or other means prevent the X-ray detecting means and consequently the X-ray photographic system from being simplified and reduced in weight.

Accordingly, recently, an X-ray image reading system having a semiconductor detecting means for converting X-ray photons into an electric signal is being developed. In this type of X-ray image reading system, being different from the X-ray image reading system using the storage phosphor, it is not necessary for the present system to irradiate the excitation light such as laser light beams for reading the X-ray image information, thereby, a blur does not occur due to scattering or diffusion of the excitation light, and an X-ray image with a very high sharpness can be obtained. Further, a scanning system and an optical reading system of the excitation light, a mechanical conveying system, and an erasing system of remaining image are not necessary. Accordingly, in the X-ray image reading system having the semiconductor detecting means, a very sharp X-ray image can be obtained as compared with the X-ray image reading system using the storage phosphor, as well as the reduction of the size and weight of the X-ray photographic system can be achieved.

In the conventional X-ray image reading system having the semiconductor detecting means, however, there are many cases in which the graininess is deteriorated as the sharpness is increased. In the low density area in which a quantity of X-rays, which reaches the detector, is small, because originally the graininess is worse due to quantum noises as compared to that in the high density area in which a quantity of X-rays is large, deterioration of the graininess as an increase of the sharpness tends to be more conspicuous, and deterioration of the graininess in the low density area corresponding to the mediastinum or the abdomen of the image of the chest, onto which an exposure of X-rays is small, is specifically conspicuous.

In such a case, when unsharpness mask processing of the X-ray image reading system using the storage phosphor is applied to the X-ray image reading system using the semiconductor detecting means, and when the low spatial frequency component and the higher spatial frequency component are emphasized so that the contrast is enhanced, there occurs a problem in which the graininess is more conspicuous and the image quality is deteriorated in the low density area of the X-ray image.

SUMMARY OF THE INVENTION

Accordingly, the present invention solves the foregoing problems, and the object of the present invention is to provide a radiation image reading system and a radiation image reading method in which the graininess can be improved in the low density area of the radiation image, while the sharpness is maintained in the high density area thereof.

In order to achieve the abovementioned objectives, there is provided a radiation image reading apparatus which is comprised of:

a semiconductor detector for converting radiation photons penetrated through a subject into electric signals to generate a first radiation image information; and a processor for processing the first radiation image information so that a modulation transfer function in a low density region is not higher than a modulation transfer function in a high density region, in order to generate a second radiation image information.

The low density area of the electric signal means a signal area in which a dosage irradiated onto (reached) the semiconductor detecting device is small. The high density area means the signal area in which a dosage irradiated onto (reached) the semiconductor detecting device is large.

Further, the low density area of the electric signal is the signal area not larger than an intermediate value between the maximum value and the minimum value of the signal area corresponding to a dosage of a portion to be used for the diagnosis in radioactive rays irradiated onto the semiconductor detecting device, and the signal area to be used for the diagnosis. In the same manner, the high density area of the electric signal is not smaller than the intermediate value, and the signal area to be used for the diagnosis.

The first image signal is the original image, and is the analog signal obtained by the semiconductor detecting means, the digital signal after the A/D conversion of the analog signal, the signal on which signal amplification processing or temperature conversion processing is conducted, or the like. A signal obtained after black and white reversal processing is conducted, may also be allowable.

DETAILED DESCRIPTION OF THE PREFERRED EMBODIMENT

Figure 1:
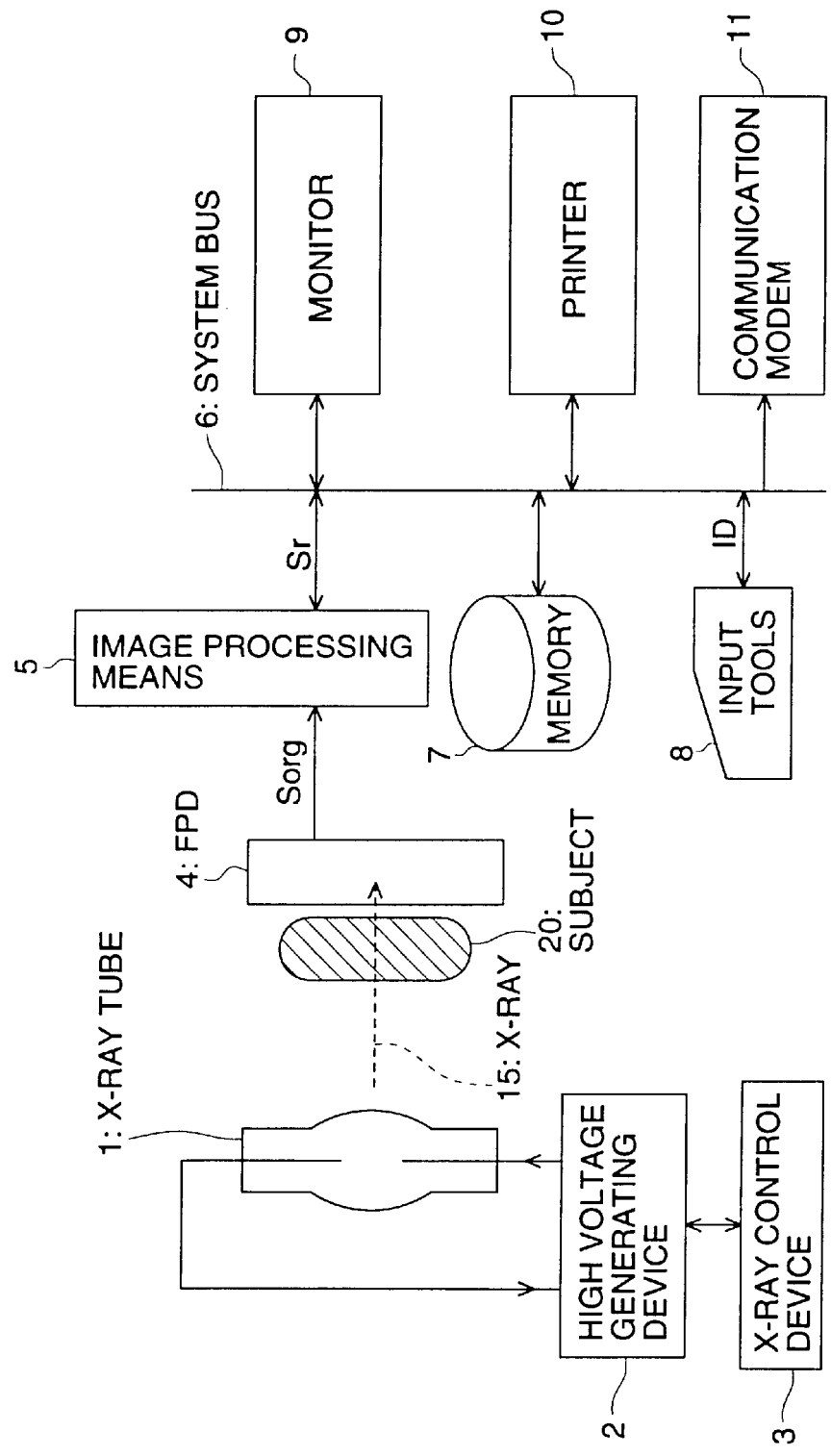
FIG. 1 is a block diagram showing an example of the structure of an X-ray image reading system 100 as an embodiment.

Referring to the drawings, an X-ray image reading system and an X-ray image reading method as examples of the present invention will be detailed below.

EXAMPLE (1)

FIG. 1 is a block diagram showing an example of the structure of an X-ray image reading system as an embodiment of the present invention. In the present example, a semiconductor detecting means for converting X-ray photons penetrated through the subject into an electric signal is provided, the X-ray image is reproduced as a visual image, and an image signal obtained from the semiconductor detecting means is corrected by a specific arithmetic expression so that the graininess is improved in the low density area of the X-ray image, and the sharpness is maintained in the high density area thereof.

The X-ray image reading system 100 of the present example is such a system that the X-ray photographic image of the chest is taken. An X-ray tube 1, a high voltage generating device 2 and an X-ray control device 3 shown in FIG. 1, as an X-ray irradiation means. The x-ray tube 1 is connected to the high voltage generating device 2, and an X-ray beam is irradiated from the X-ray tube 1 to a subject 20. As the high voltage generating device 2, a capacitor type one or an inverter type one is used, and as X-ray generating voltage, AC 100 V, which is the battery or commercial power, is stepped up to 100 kV or 120 kV. The X-ray control device 3 is connected to the high voltage generating device 2, and the irradiation energy of an X-ray beam 15 irradiated from the X-ray tube 1 to the subject 20 is controlled thereby.

At the back of the subject 20, a flat panel detector (hereinafter, referred to as FPD) 4 as a semiconductor detecting means is located, and in the case of X-ray photographing, X-ray photons penetrated through the subject 20 are received by each pixel, and are converted into an electric signal (hereinafter, referred to as the original image signal Sorg).

A concrete example of the FPD is disclosed in Japanese Patent Publication Open to Public Inspection No. 342098/1994. That is, in the example, the X-ray penetrated through the subject is absorbed in the photo-conductive layer such as an a-Se layer, or the like; electric charges corresponding to the strength of the X-ray are generated; and an amount of the electric charges is detected for each pixel. As an example of another FPD system, there is a method as disclosed in Japanese Patent Publication Open to Public Inspection No. 90048/1997 in which the X-ray is absorbed in the fluorescent substance layer such as an intensifying screen, or the like, and the fluorescence is generated; and the strength of the fluorescence is detected by the optical detector such as a photodiode provided for each pixel. As other fluorescence detecting means, there is also a method using a CCD or a C-MOS sensor.

Specifically, in the FPD of the system disclosed in Japanese Patent Publication Open to Public Inspection No.

342098/1994, a quantity of the X-ray is directly converted into an amount of electric charges for each pixel, thereby, deterioration of the sharpness of the image in the FPD is small, and the image with the excellent sharpness can be obtained. Accordingly, the effect of the X-ray image reading system and the X-ray image reading method of the present invention is very large and greatly suitable for use.

An image processing means 5 is connected to the output stage of the FPD 4, and the original image signal Sorg by the FPD 4 is image-processed, and the X-ray image of the subject 20 is reproduced. In the present example, when the X-ray image of the subject 20 is reproduced, the modulation transfer function in the low density area in the X-ray image is made to be lower than that in the high density area thereof.

A system bus 6 is connected to the output stage of the image processing means 5. A memory 7 is connected to the system bus 6, and X-ray image information Sr of the subject 20 is recorded therein. For example, an opt-magnetic disk is used as the memory 7. An input tool 8 is connected to the system bus 6 as an input means, and an individual identification information ID is inputted into that relating to the X-ray image. As the individual identification information ID, a photographing location such as a hospital name and a ward, photographing time, a name, age, and the distinction of sex of the patient are recorded.

Further, a monitor 9 is connected to a system bus 6 as an image forming means, and an X-ray image of the subject 20 is displayed thereon according to the X-ray image information Sr of the subject 20. As the monitor 9, a cathode ray tube (CRT) or a liquid crystal display is used. In addition to that, a printer 10, serving as an image forming means, is connected to the system bus 6, and an X-ray image of the subject 20 is printed out according to the X-ray image information Sr of the subject 20. In this example, a communication modem 11 is connected to the system bus 6, and the X-ray image information Sr of the subject 20 is transmitted to other hospitals thereby.

Figure 2:
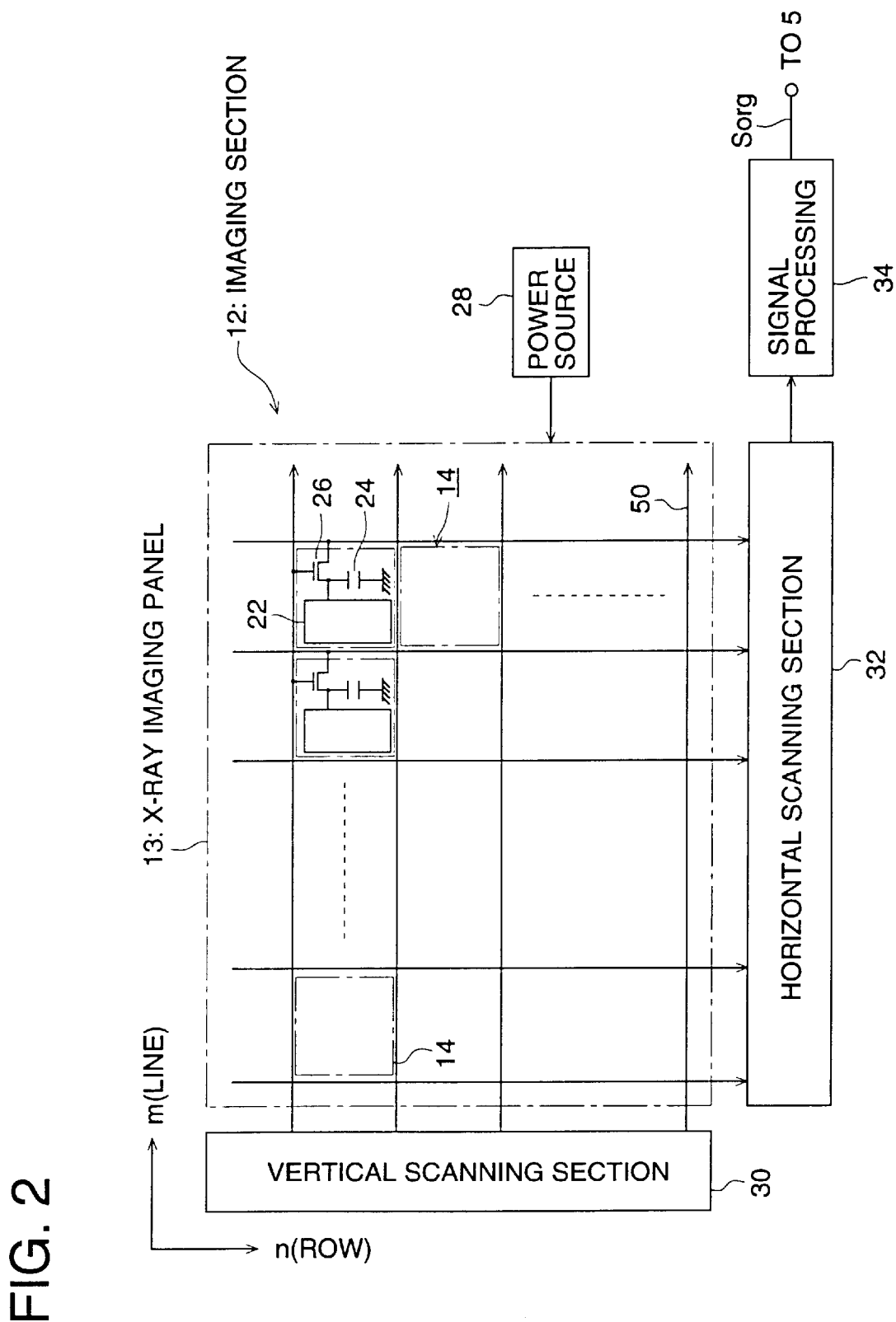
FIG. 2 is a circuit diagram showing an example of the structure of a flat panel detector (FPD) 4.

In succession to the above, the internal structure of the FPD 4 will be exemplified. FIG. 2 is an example of a circuit diagram showing the panel structure of the FPD 4 used in the present invention. In the present example, the X-ray 15 penetrated through the tissue of the human body is projected on the FPD 4, and in the FPD 4, the X-ray image is converted into an electric signal (original image signal) Sorg and outputted. In FIG. 2, the FPD 4 has an imaging section 12. The imaging section 12 comprises a vertical and horizontal scanning sections 30 and 32, and a signal processing circuit 34 in addition to the X-ray imaging panel 13.

The basic structure of the X-ray imaging panel 13 itself is similar to the conventional one, and a conversion cell, which is a basic unit, has a capacitor 24 to accumulate generated electric charges and a switching transistor 26 of the TFT structure to take out the accumulated electric charges, in addition to an electric charge generating section 22. In the electric charge generating section 22, a pixel electrode to receive x-ray photons for each pixel unit with respect to the X-ray image of the subject 20 is dividedly provided, and the pixel electrodes of m (lines)×n (rows) are provided on the substrate. An example of its sectional structure is shown in FIG. 3.

Figure 3:
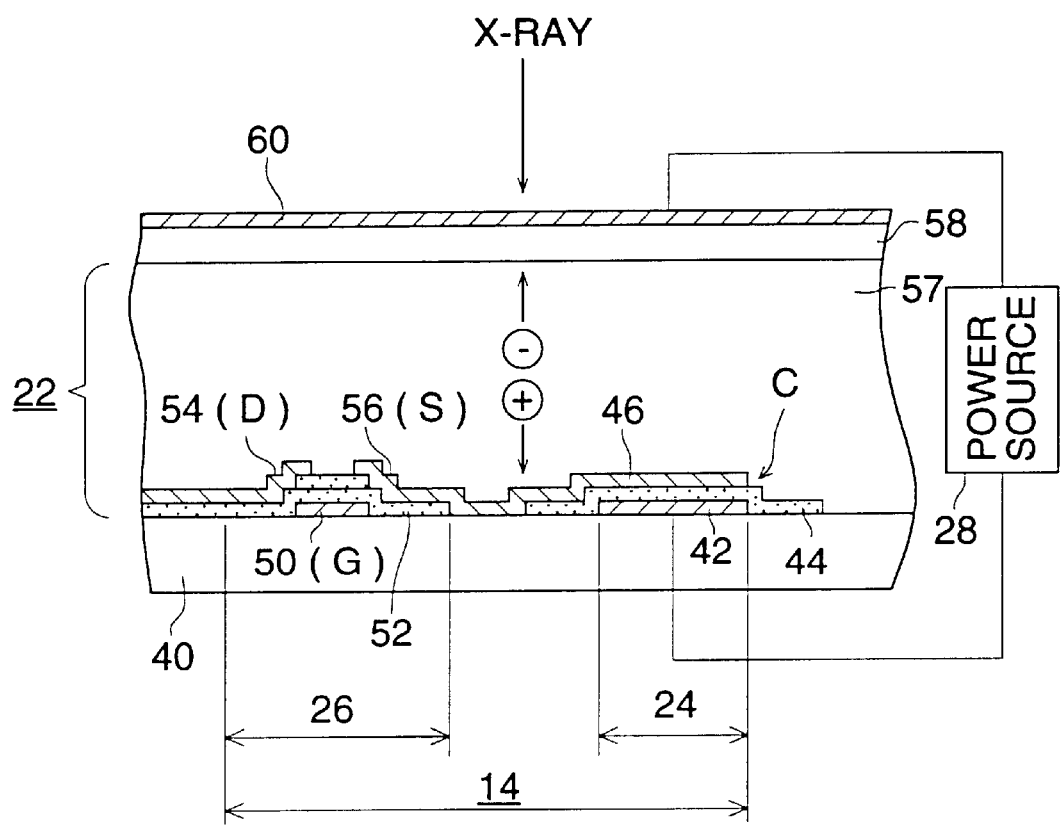
FIG. 3 is a sectional view showing the cell structure of the FPD 4.

The basic structure of the above example is also similar to the conventional one, and a plurality of conversion cells 14 are formed in the matrix-like(m×n) structure on the substrate shown in FIG. 3, for example, a glass substrate 40. That is, a substrate electrode 42, a pixel electrode 46 and an insulation layer (a dielectric layer such as $SiO_2$) 44 are formed by adhesion on the glass substrate and a capacitor(capacity: C) 24 is structured. In this capacitor 24, the electric charge due to X-ray photons received by the pixel electrode 46 is accumulated. Accordingly, the capacitor 24 is also provided for each pixel electrode 46.

Further, a switching transistor 26 is provided adjoining the capacitor 24 in the same manner as the conventional one. The electric charge accumulated in the capacitor 24 is read out and controlled by the switching transistor 26. The transistor 26 is structured by a gate electrode 50, a drain electrode 54 and a source electrode 56, which are respectively formed by adhesion, as shown in the drawing, and the source electrode 56 is connected to the pixel electrode 46 of the capacitor 24.

The electric charge generating section 22 having a predetermined thickness is provided on the upper surface of the capacitor 24 and the switching transistor 26. In the present invention, as a photo conductive layer 57 constituting the electric charge generating section 22, a photo conductive compound having a high X-ray absorption rate is used. In the present example, amorphous selenium or the like is used as the photo conductive layer 57.

Further, on the upper surface of the photo conductive layer 57, a common electrode 60 as a surface electrode is formed by adhesion in the same manner as the conventional one, and thus, an X-ray imaging panel 13 is structured. It may be also possible to form a dielectric layer 58 shown in FIG. 3 between the photo conductive layer 57 and the common electrode 60.

In the present example, an electron·hole pair, which is generated in the photo conductive layer 57 by X-ray photons penetrated through the subject 20, is separated by an electric field generated between the common electrode 60 and a substrate electrode 42, and electric charges accumulated in the capacitor 24 by this electric field are read out and controlled by the switching transistor 26. This electric field is generated by a predetermined potential voltage applied from the power source 28 onto the common electrode 60 and the substrate electrode 42, for example, DC voltage of about 1 kV to 5 kV.

The above cited switching transistor 26 is gate-controlled (on/off control) by a vertical scanning section 30, and when each transistor 26 is selected in a time series, electric charges read from the drain electrode 54 of the selected transistor are outputted to the signal processing circuit 34 through the horizontal scanning section 32. In the signal processing circuit 34, the original image-signal Sorg obtained after an electric signal is amplified, is outputted to the image processing means 5.

Following to the above, referring to FIGS. 4 to 9, a correction method of the original image signal Sorg in the image processing means 5 will be described below. In this example, a case in which a photograph of an X-ray image of the tissue of the chest of the human body is taken, is considered. Originally, the chest image of the human body has small exposure of the X-ray beam 15, and thereby, the graininess in the low density area is not satisfactory. Especially in the chest image, since the difference of density between the high density area and the low density area is great, namely, the difference of radiation amount is remarkable, the graininess in the low density area tends to be conspicuous.

Figure 5:
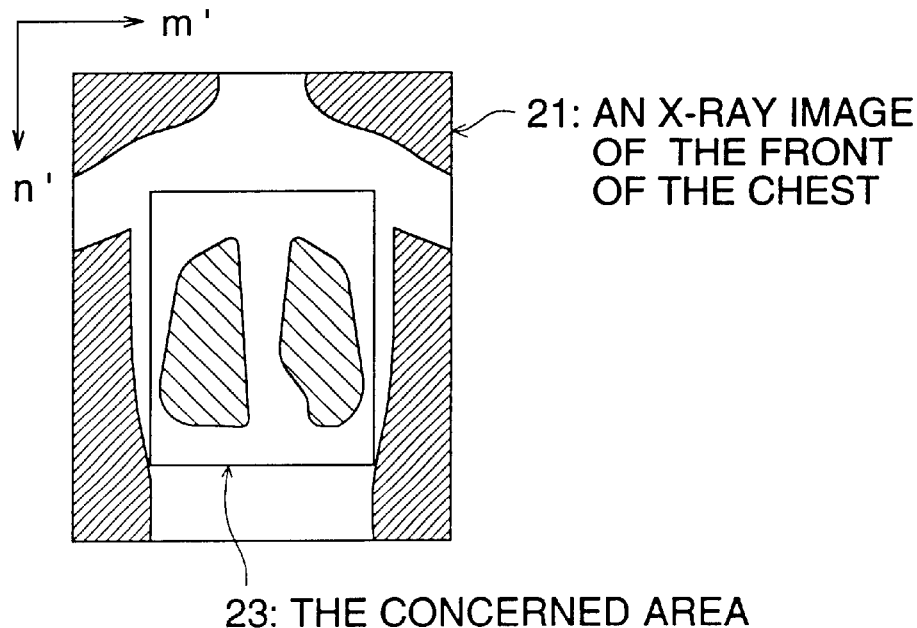
FIG. 5 is a view showing an example of the X-ray image of the chest of the human body.

Accordingly, in the present example, the original image signal Sorg is corrected such that the modulation transfer function in its low density area is made to be lower than that in its high density area, so that the graininess in the low density area of the concerned area 23 of the X-ray image 21 of the front of the chest shown in FIG. 5, is improved, and the sharpness is maintained in its high density area. In FIG. 5, the concerned area is a rectangular area including the lungs and mediastinum portions. Initially, the subject (patient) 20 stands between the X-ray tube 1 and the FPD 4 in the same manner as the conventional one. The X-ray control device 3 steps up the X-ray generating voltage by the high voltage generating device 2 so that the X-ray beam 15 having a predetermined energy can be obtained. Then, when the X-ray irradiation is turned on, the X-ray beam 15 is irradiated from the X-ray tube 1 onto the subject 20. When the X-ray beam 15 is irradiated onto the subject 20, the X-ray photons penetrated through the subject 20 are received by each pixel on the FPD 4 located at the back of the subject 20, and directly converted into the original image signal Sorg.

Figure 4:
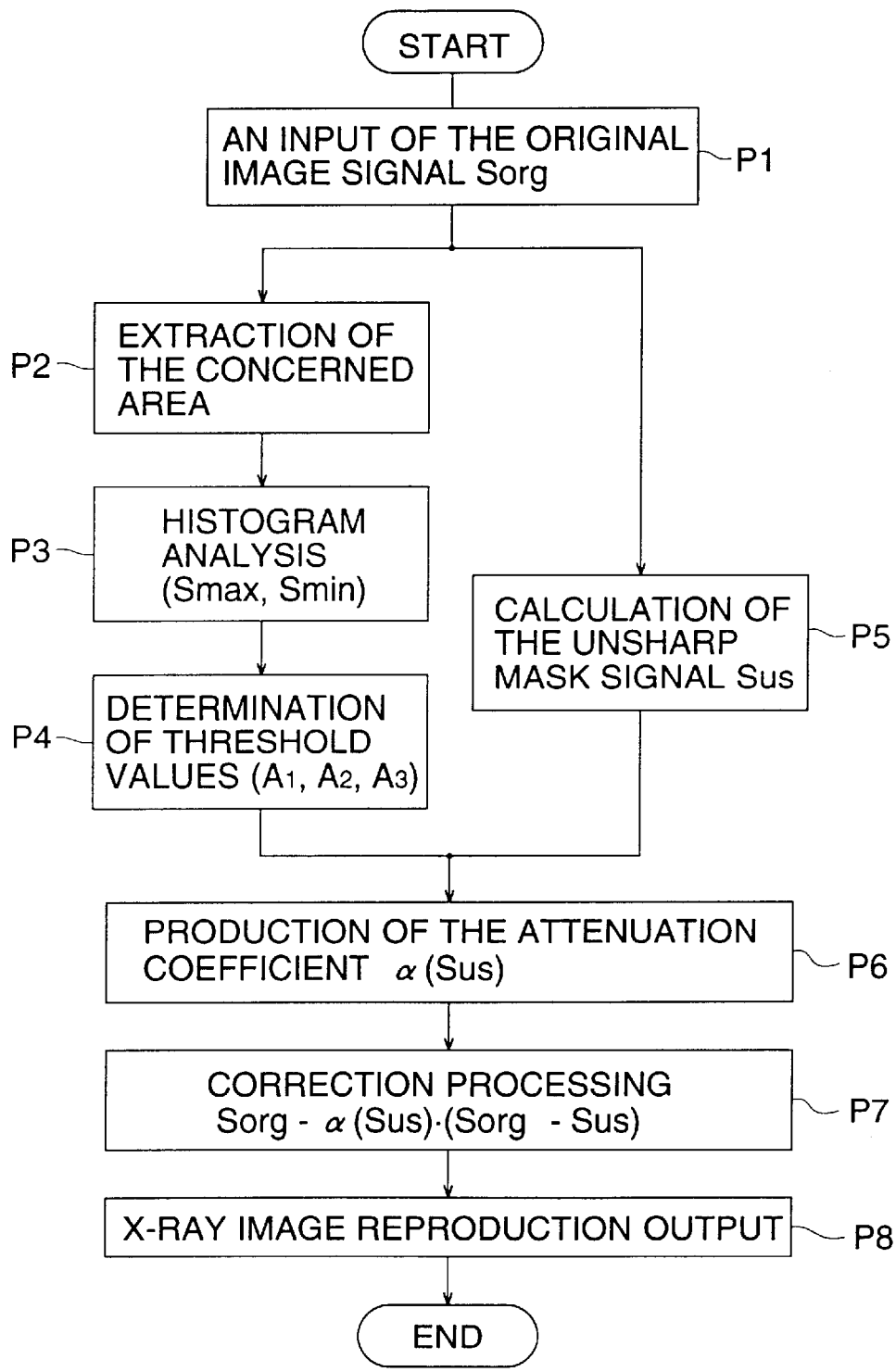
FIG. 4 is a flow chart showing correction algorithm of an original image signal Sorg.

Next, the original image signal Sorg is inputted from the FPD 4 into the image processing means 5 in step P1 of the algorithm (flow chart) shown in FIG. 4. The original image signal Sorg obtained from the FPD 4 is a signal having very high sharpness as shown in FIG. 9A. The frequency component of such the original image signal Sorg is shown in FIG. 9A. In FIGS. 9A to 9D, the abscissa shows the spatial frequency (cycle/mm) and the ordinate shows the modulation transfer function (MTF).

Figure 6:
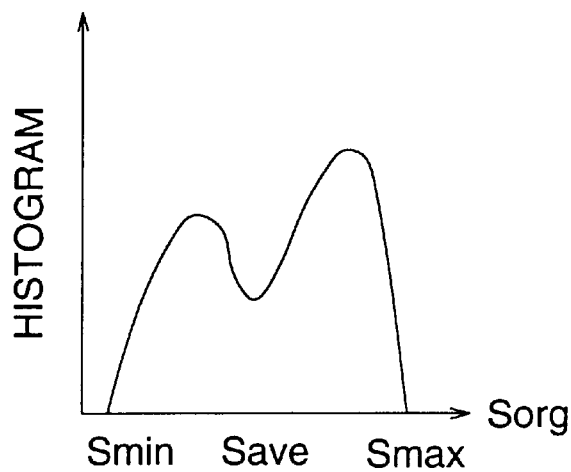
FIG. 6 is a view showing a histogram of the original image signal Sorg.

Then, the concerned area 23 is extracted from the X-ray image 21 of the front of the chest of the subject 20 in step P2. As the concerned area 23, pixels of m'×n' are extracted. Next, in step P3, the histogram analysis is carried out according to the original image signal Sorg of the concerned area 23. For example, a histogram shown in FIG. 6 is obtained with respect to the concerned area 23 of the X-ray image 21 of the front of the chest shown in FIG. 5. In FIG. 6, the abscissa shows the original image signal Sorg, and the ordinate shows the frequency of occurrence of the signal. The maximum value of the original image signal Sorg is Smax, and its minimum value is Smin. In the present example, 3 changing points of the frequency of occurrence of the signal exist as shown in FIG. 6.

After that, in step P4, 3 threshold values $A_1$, $A_2$ and $A_3$ are determined corresponding to the changing points of the frequency of occurrence of the signal. Generally, it is preferable that the threshold value Ai (i=1, 2, 3) is determined for each X-ray image, because the transmission characteristic of the X-ray or the photographic condition is different for each subject 20. Herein, when the maximum value of the original image signal Sorg is Smax, its minimum value is Smin, and a constant is ki (i=1. 2. 3), 3 threshold values Ai of the original image signal Sorg are determined. These threshold values Ai are determined by the following arithmetic expression (2):

$$Ai = ki \cdot Smax + (1-ki) \cdot Smin \quad (2)$$

In the present example, different constants ki, for example, 0.2. 0.5, 0.8, may be determined for 3 threshold values $A_1$, $A_2$ and $A_3$. An example of the threshold values $A_1$, $A_2$ and $A_3$ is shown in the arithmetic expression (3).

$$A_1 = 0.2 \cdot Smax + 0.8 \cdot Smin$$

$$A_2 = 0.5 \cdot Smax + 0.5 \cdot Smin$$

$$A_1 = 0.8 \cdot Smax + 0.2 \cdot Smin \quad (3)$$

For these threshold values Ai, predetermined values may be used, or threshold values Ai may be obtained by a combination of a central value Smedian and a mean value Save, other than the maximum value Smax, minimum value Smin of the original image signal Sorg.

In parallel to the above cited steps P2 to P4, in order to carry out the blurred mask processing in step P5, the unsharp mask signal Sus is calculated. In this example, the unsharp mask in the image processing is used for obtaining the unsharp mask signal Sus.

An unsharp mask signal Sus corresponding to a pixel can be obtained by such a calculation that a value of the original image signal Sorg included in a square mask formed of one side of "a" pixels around the target pixel is simply averaged. The larger the mask size (the number of pixels "a" of one side) is, the farther original image signal Sorg from the target pixel is included and averaged, thereby, the frequency band of the modulation transfer function is the more narrowed, and the more blurred image is obtained.

The shape of the mask is not limited to a square, but a rectangular, a circle, a cross, etc., may be used, and the target pixel does not have to be the center of the mask. Further, when the modulation transfer function is attenuated, the calculation method is not limited to the simple average, but a method for obtaining each kind of representative values using a value of the original image signal Sorg corresponding to pixels included in the mask may be used. For example, each kind of weighted average values, median values, or mode values may be used. An example of characteristics of the relationship of the modulation transfer function of the unsharp mask signal Sus to the spatial frequency is shown in FIG. 9B.

In this unsharp mask, the modulation transfer function is more than 0.5 when the spatial frequency is 0.1 cycle/mm, and when the spatial frequency is 10 cycle/mm, the modulation transfer function less than 0.5 is used. Thereby, the frequency components higher than the low spatial frequency relating to the concerned area 23 are attenuated.

After that, in step P5, an attenuation coefficient a (Sus) to improve the graininess in the low density area of the concerned area 23 is prepared. In the present example, a preferable value of the attenuation coefficient α (Sus) is 0 to 1.0, and an image reproduction signal Sr shows a frequency response intermediate between the original image signal Sorg and the unsharp mask signal Sus. For example, the attenuation coefficient α (Sus) is obtained by the following arithmetic expressions (4):

$$\alpha\,(sus) = 1.0 \qquad (Sus \leq A_1)$$
$$\alpha\,(sus) = -1 \cdot (Sus - A_2)/(A_2 - A_1) \quad (A_1 < Sus \leq A_2)$$
$$\alpha\,(sus) = 0 \qquad (A_2 < Sus) \quad (4)$$

In the present example, the attenuation coefficient α shown by the above cited form of functions are determined according to the threshold values Ai obtained for each X-ray image, and a table is prepared and used each time.

When these attenuation coefficients α (Sus) are prepared, correction processing of the original image signal Sorg is carried out in step P7. In the present example, attenuation coefficients α are monotonously decreased corresponding to an increase of the unsharp mask signal Sus, and the image reproduction signal Sr is calculated according to the following arithmetic expression (5):

$$Sr = Sorg - \alpha(Sorg - Sus) \quad (5)$$

Relating to the original image signal Sorg and the unsharp mask signal Sus in a parenthesis of the second item of the above cited expression (5), an example of characteristic of the relationship between the modulation transfer function and the spatial frequency is shown in FIG. 9C.

Figure 8:
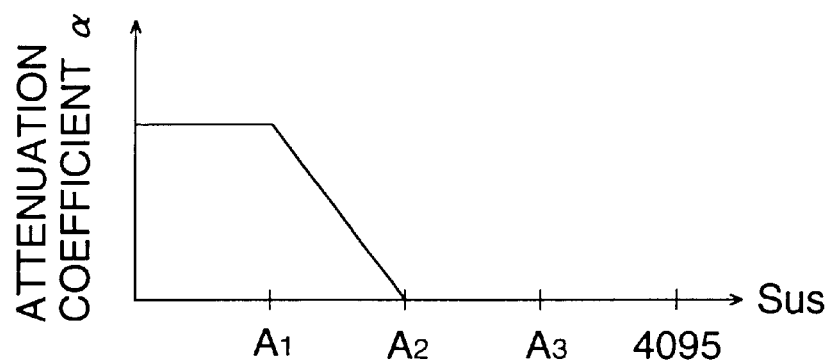
FIG. 8 is a view showing the relationship between the attenuation coefficient $\alpha$ and the unsharp mask signal Sus.
Figure 9:
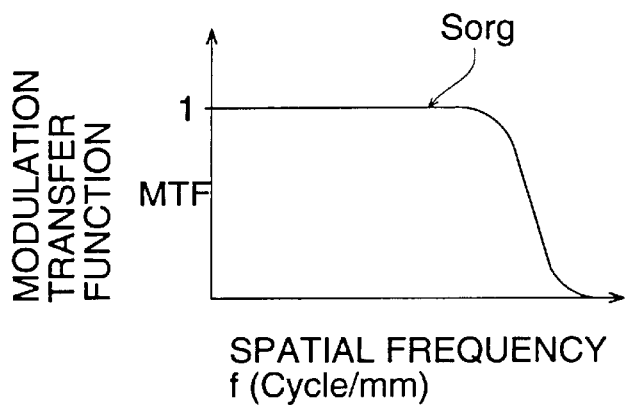
FIGS. 9(A) to 9(D) are characteristic views showing the relationship of the modulation transfer function to the spatial frequency, which show a correction method of the original image signal Sorg.
Figure 9:
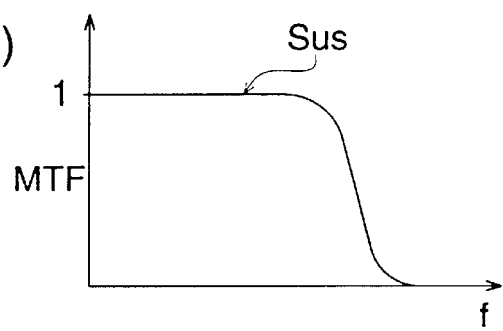
Figure 9:
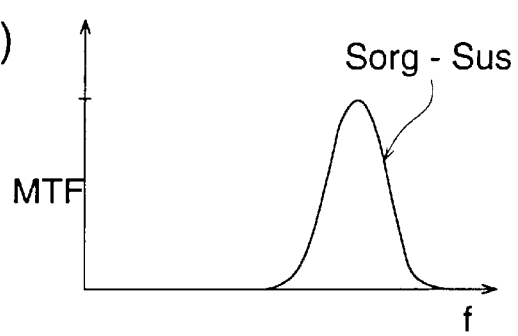
Figure 9:
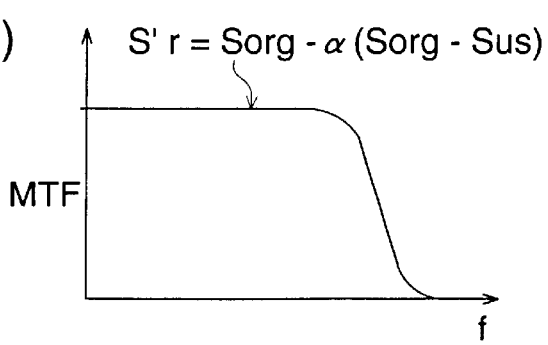

The monotonously decreasing method of the attenuation coefficient α is conducted according to the above cited expression (4). When the attenuation coefficient α (Sus) is monotonously decreased, its status is as shown in FIG. 8. In FIG. 8, the abscissa is the unsharp mask signal (level: 0-4095) Sus, and the ordinate is the attenuation coefficient α (Sus).

Although it is acceptable to decrease the attenuation coefficient α with the increase of the original mask signal Sorg, it is more preferable that the attenuation coefficient α is monotonously decreased corresponding to an increase of the value of the unsharp mask signal Sus. The reason is that, relating to a degree of the attenuation, it is preferable to give the strength corresponding to the average change of the density of the noticeable position such as, for example, the heart portion or the lung portions, in the concerned area 23, and the change depending on the position is too large in the case of the original image signal ⁻Sorg.

Relating to the image reproduction signal Sr obtained by the above cited arithmetic expression (5), an example of the characteristic of relationship between the modulation transfer function and the spatial frequency is shown in FIG. 9D. According to FIG. 9D, the image reproduction signal Sr can be corrected such that it is shifted to the low spatial frequency side as compared to the characteristic of the relationship between the modulation transfer function and the spatial frequency of the original image signal Sorg.

After that, the X-ray image information Sr is outputted from the image processing means 5 to the monitor 9 or the printer 10. According to that, the graininess is improved in the low density area of the concerned area 23 of the X-ray image 21 of the front of the chest of the subject 20, as well as an image, in which the sharpness is maintained in the high density area, can be read.

Thus, according to the present example, when the X-ray image of the subject 20 is reproduced, the modulation transfer function in the low density area of the X-ray image is made to be lower than that in the high density area. Accordingly, the graininess can be improved in the low density area of the X-ray image, and the sharpness can be maintained in the high density area thereof.

(2) Other Examples

Figure 7:
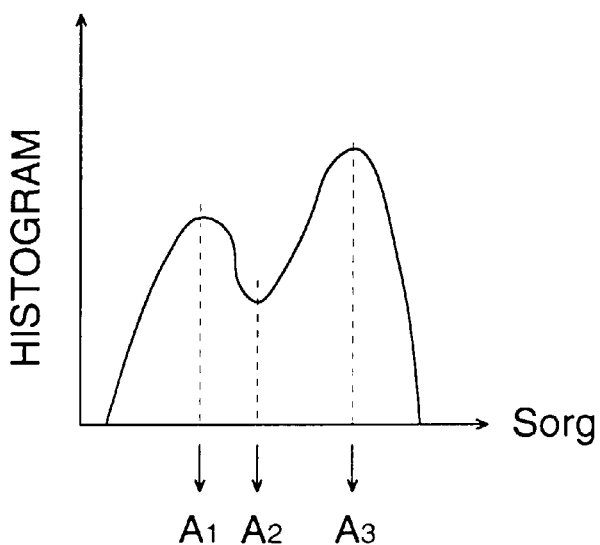
FIG. 7 is a view showing the relationship between the original image signal Sorg and threshold values $A_1$, $A_2$ and $A_3$.

In the above cited example, an example in which 3 threshold values $A_1$, $A_2$ and $A_3$ are obtained by the arithmetic expression (2), is explained, however, the present invention is not limited to this, but the shape of the histogram itself may be analyzed. For example, as shown in FIG. 7, the image signal values are detected from a peak portion and bottom portion of the histogram, and the threshold value Ai may be obtained according to the values.

Figure 10:
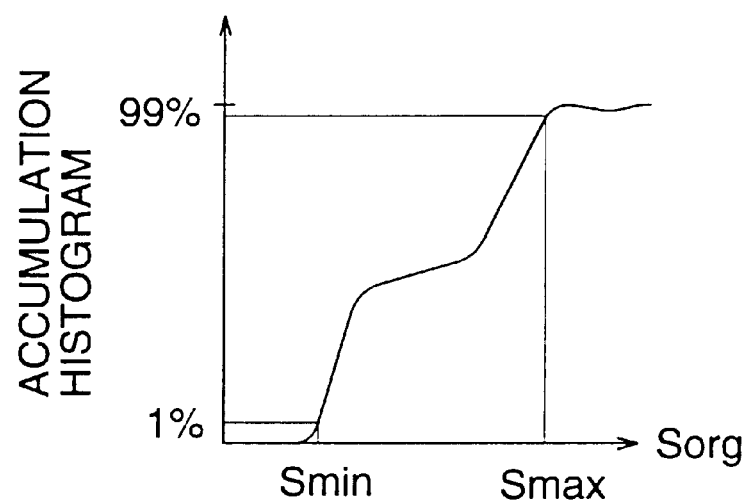
FIG. 10 is a view showing an example for obtaining the maximum value and the minimum value of the original image signal Sorg from the accumulation histogram.

Further, the image signal value as the standard of the original image signal Sorg may be obtained by using the accumulation histogram shown in FIG. 10. For example, relating to the minimum value of the concerned area 23, a signal value corresponding to the accumulation histogram of 1% may be determined as Smin, and relating to the maximum value thereof, a signal value corresponding to the accumulation histogram of 99% may also be determined as Smax.

This histogram analysis may be conducted not only for the original image signal Sorg but also for the unsharp mask signal Sus. Further, the analysis may also be conducted for the thinned image of these image signals. The threshold value Ai is previously stored so that the attenuation coefficient α is changed at thus obtained threshold value Ai, and the attenuation coefficient α (Sus) may also be obtained for each image by rotation or parallel movement of the basic function of the threshold value Ai.

Figure 11:
Figs. 11(A) and 11(B) are views (part 1) showing an example of the changeability of the attenuation coefficient $\alpha$.
Figure 11:
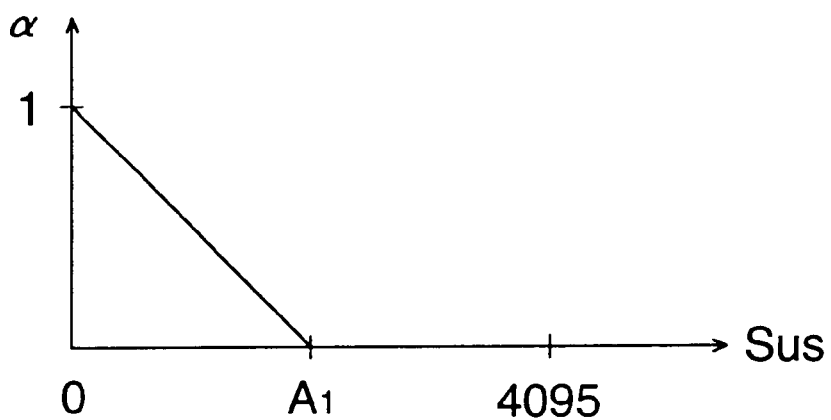

In this example, the attenuation coefficient α (Sus) can be changed (conversion of the attenuation coefficient α to the unsharp mask signal Sus) as shown in FIG. 8, but the present invention is not limited to this example. As shown in FIG. 11A, the attenuation coefficient α (Sus) may be monotonously decreased (like a primary function) to 1.0-0, with respect to the unsharp mask signal Sus of a level of 0-4095, and further, as shown in FIG. 11B, the attenuation coefficient α (Sus) may be decreased to 1.0-0, up to the threshold value $A_1$ of the unsharp mask signal Sus.

Further, a form of the function of the attenuation coefficient α (Sus) is fixed, and the overall original image signal may be shifted so that a value corresponding to the threshold value Ai obtained by analysis of the X-ray image matches the predetermined threshold value A'i (the fixed value). In this case, the attenuation coefficient α (Sus) is a fixed value, therefore, it is preferable to store the value as a table.

In the monotonous decrease of the attenuation coefficient α (Sus), it is not necessary that the attenuation coefficient α (Sus) is absolutely decreased corresponding to an increase of the original image signal Sorg or the unsharp mask signal Sus, but an area in which the attenuation coefficient α (Sus) is not changed, may also exist. This is for the following reason: sometimes it is also preferable that the attenuation coefficient α (Sus) is not decreased lower than a predetermined density, or the attenuation coefficient α (Sus) is constant without depending on the density and is slightly decreased.

Figure 12:
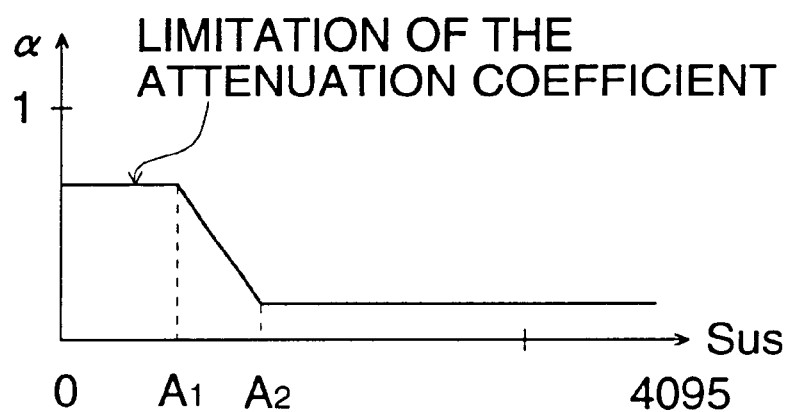
FIGS. 12(A) and 12(B) are views (part 2) showing an example of the changeability of the attenuation coefficient $\alpha$.
Figure 12:
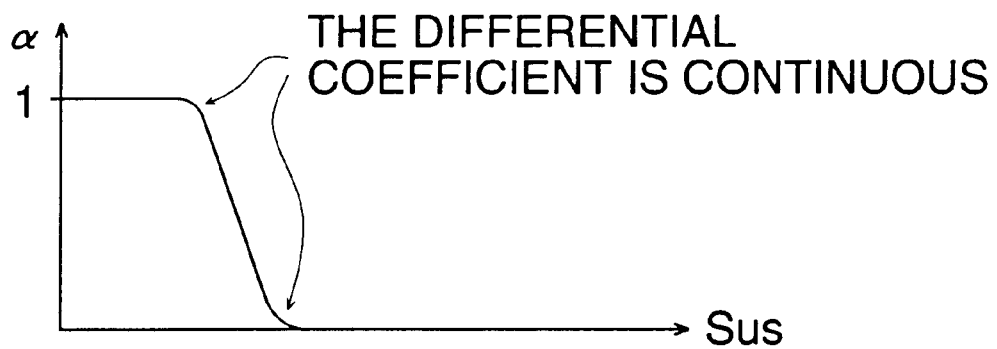

In such the case, for example, in the unsharp mask signal Sus shown in FIG. 12A, it is preferable that the attenuation coefficient α (Sus) is limited to a predetermined value in a range lower than the threshold value $A_1$, and in a range lower than a predetermined density, a value of the attenuation coefficient α (Sus) is not increased larger than that value.

Further, when a differential coefficient of the falling portion of the attenuation coefficient α (Sus) shown in FIG. 12B is continuous in the vicinity of [1] and [0], a false image is not generated, which is more preferable for correction processing.

(1) EXAMPLE 1

Figure 13:
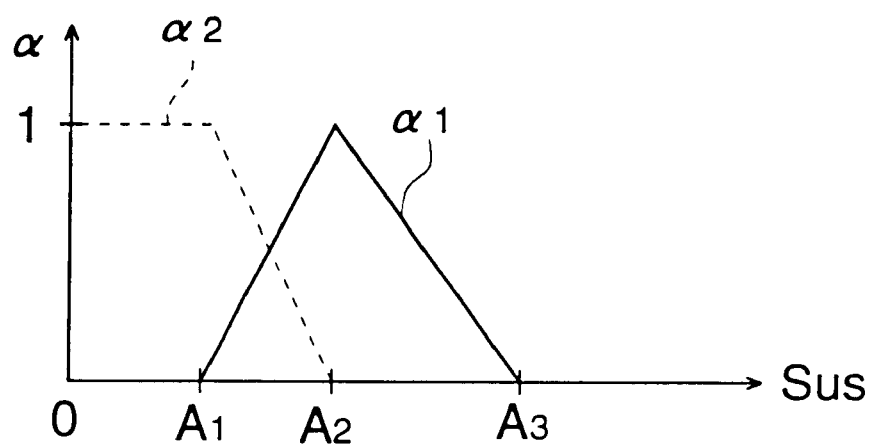
FIG. 13 is a view showing an example of correction using two attenuation coefficients $\alpha_1$ and $\alpha_2$.
Figure 14:
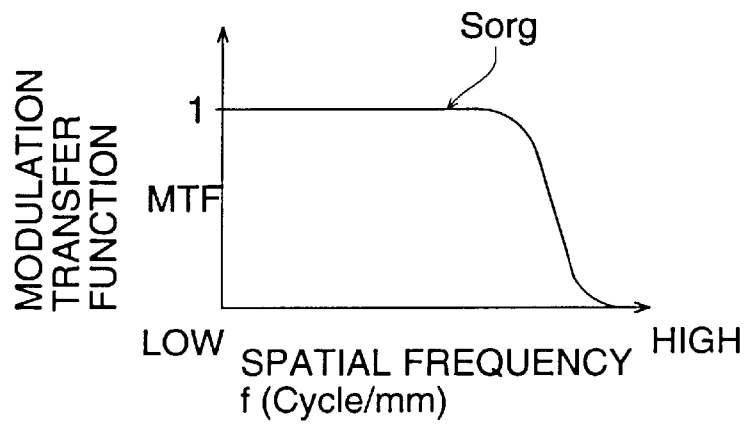
FIGS. 14(A) to 14(C) are characteristic views (part 1) showing the relationship of the modulation transfer function to the spatial frequency when attenuation coefficients $\alpha_1$ and $\alpha_2$ are used.
Figure 14:
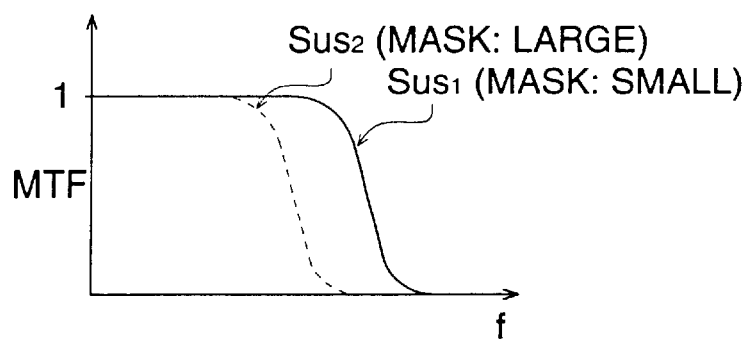
Figure 14:
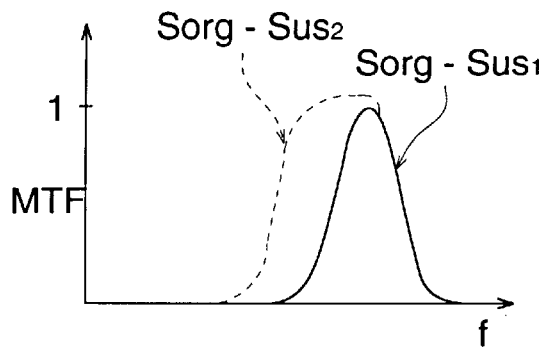

Next, referring to FIGS. 13 and 14, a case in which the original image signal Sorg is corrected by using 2 attenuation coefficients $\alpha_1$ and $\alpha_2$, will be described. In this example, 2 unsharp mask signals $Sus_1$ and $Sus_2$ whose mask sizes are different from each other, are used. In the mask size, such the case is considered that the unsharp mask signal $Sus_2$ is larger than the unsharp mask signal $Sus_1$.

The original image signal Sorg obtained from the above-cited FPD 4 is a signal having a very high sharpness as shown in FIG. 14A. In FIG. 14A, the abscissa is the spatial frequency f (cycle/mm), and the ordinate is the modulation transfer function (MTF). On the one side, according to the original image signal Sorg, the characteristic of the relationship of the modulation transfer function to the spatial frequency of the unsharp mask signals $Sus_1$, (small mask) and $Sus_2$ (large mask) as shown in FIG. 14B is obtained.

On the other side, for example, the attenuation coefficient $\alpha_1$ (Sus) is obtained by the following arithmetic expression (6):

$$\alpha_1 (sus) = 0 \qquad (Sus \leq A_1) \qquad (6)$$
$$\alpha_1 (sus) = (Sus - A_1)/(A_2 - A_1) \qquad (A_1 < Sus \leq A_2)$$
$$\alpha_1 (sus) = -1 \cdot (Sus - A_3)/(A_3 - A_2) \qquad (A_2 < Sus \leq A_3)$$
$$\alpha_1 (sus) = 0 \qquad (A_3 < Sus)$$

Next, the attenuation coefficient $\alpha_2$ (Sus) is obtained by the following arithmetic expression (7):

$$\alpha_2 (sus) = 1.0 \qquad (Sus \leq A_1) \qquad (7)$$
$$\alpha_2 (sus) = -1 \cdot (Sus - A_2)/(A_2 - A_1) \qquad (A_1 < Sus \leq A_2)$$
$$\alpha_2 (sus) = 0 \qquad (A_2 < Sus)$$

After that, when 2 attenuation coefficients are $\alpha_1$ and $\alpha_2$, unsharp mask signals are $Sus_1$ and $Sus_2$, the original image signal is Sorg, and the image reproduction signal is Sr, the image production signal Sr' is obtained by the following arithmetic expression (8):

$$Sr' = Sorg - \alpha_1(Sorg - Sus_1) - \alpha_2(Sorg - Sus_2) = (1 - \alpha_1 - \alpha_2) Sorg + \alpha_1 \cdot Sus_1 + \alpha_2 \cdot Sus_2 \text{ (where } \alpha_1 + \alpha_2 = 1) \qquad (8)$$

Relating to the original image signal Sorg and unsharp mask signals $Sus_1$ and $Sus_2$ in parentheses in the second and third items in the above cited expression (8), an example of the characteristic of the relationship of the modulation transfer function to the spatial frequency shown in FIG. 14C can be obtained.

Figure 15:
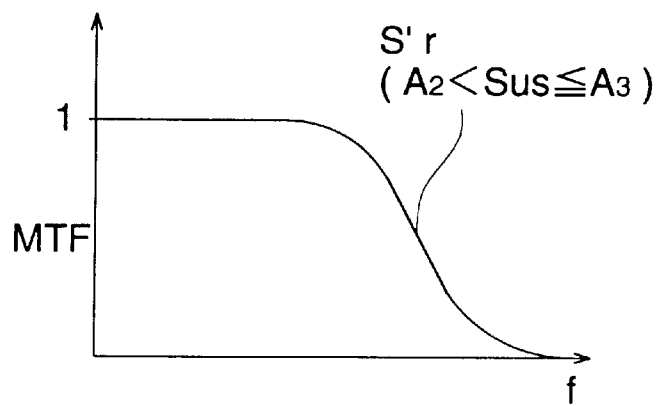
FIGS. 15(A) and 15(B) are characteristic views (part 2) showing the relationship of the modulation transfer function to the spatial frequency when attenuation coefficients $\alpha_1$ and $\alpha_2$ are used.
Figure 15:
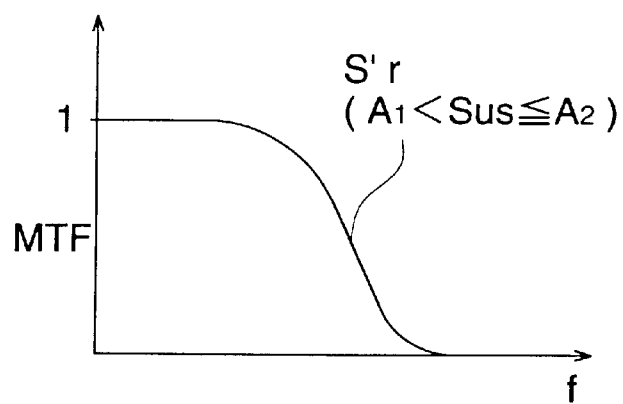

Relating to the image reproduction signal Sr' obtained by the above cited expression (8), when the unsharp mask signals Sus is $A_2 < Sus \leq A_3$, an example of the characteristic of the relationship of the modulation transfer function to the spatial frequency shown in FIG. 15A can be obtained. According to FIG. 15A, relating to the image reproduction signal Sr', the following correction can be carried out: the characteristic of the relationship of the MTF of the original image signal Sorg to f is shifted to the low spatial frequency side.

Further, relating to the image reproduction signal Sr' obtained by the above cited expression (8), when the unsharp mask signals Sus is $A_1 < Sus \leq A_2$, an example of the characteristic of the relationship of the modulation transfer function to the spatial frequency shown in FIG. 15B can be obtained. According to FIG. 15B, relating to the image reproduction signal Sr', the following correction can be carried out: the characteristic of the relationship of the MTF of the original image signal Sorg to f is further shifted to the low spatial frequency side.

In the case where correction processing is conducted by using one of the aforesaid attenuation coefficient $\alpha$ (Sus), relating to the modulation transfer function of the specific frequency area, the lower the original image signal Sorg is, the more the image signal is attenuated. In contract to this, when the original image signal Sorg is corrected by using 2 attenuation coefficients $\alpha_1$ and $\alpha_2$ in this example, in addition to the above cited effects, such an effect can be obtained that the smaller is the original image signal Sorg, the wider is the frequency range for the image signal to be attenuated.

(2) EXAMPLE 2

Figure 16:
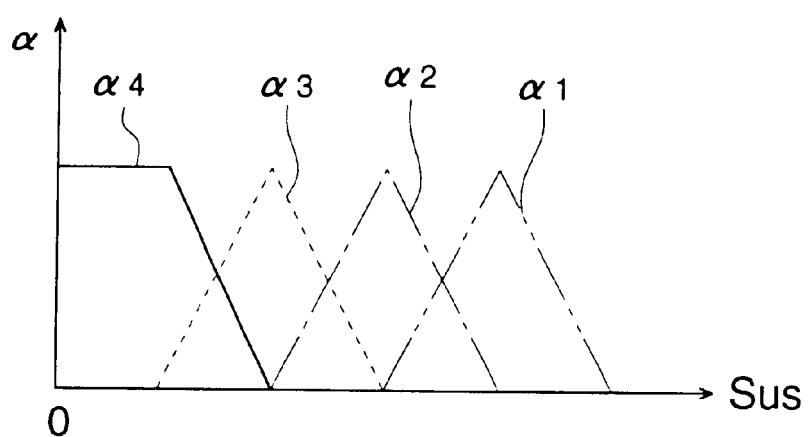
FIG. 16 is a view showing an example of the changeability when a plurality of attenuation coefficients $\alpha_1$, $\alpha_2$, $\alpha_3$ and $\alpha_4$ are used.

Following to the above, referring to FIG. 16, a case in which the original image signal Sorg is corrected by using n attenuation coefficients $\alpha_1 - \alpha_n$, will be described below. In the above cited example, the case in which 2 unsharp mask signals $Sus_1$ and $Sus_2$ are used, has been described, however, the correction is not limited to that, but n unsharp mask signals $Sus_1 - Sus_n$, may also be used.

When this is expressed by a general expression, the following arithmetic expression (9) is obtained.

$$Sr'' = Sorg - \sum_{i=1}^{n} \alpha i \cdot (Sorg - Sus i) \qquad (9)$$

$$\left( \sum_{i=1}^{n} \alpha i = 1 \right)$$

In the present example, the original image signal Sorg is corrected by 4 attenuation coefficients $\alpha_1, \alpha_2, \alpha_3$ and $\alpha_4$. In the mask sizes, the unsharp mask signal $Sus_4$ is the largest, and the mask sizes are gradually smaller in the order of $Sus_3$, $Sus_2$, and $Sus_1$. An example of the method to make attenuation coefficients $\alpha_1, \alpha_2, \alpha_3$ and $\alpha_4$ change in this case, is shown in FIG. 16.

In the present example, the case in which the smaller is the original image signal Sorg or the unsharp mask signal Sus, the larger is made the attenuation coefficient $\alpha$ (Sus), has been described as above, however, the present invention is not limited to that, but the image processing means 5 may be structured such that the attenuation coefficient $\alpha$ (Sus) is constant, and the smaller is the original image signal Sorg, the larger is made the mask size. Further, both methods may also be combined.

Although, in the present example, the case in which the original image signal Sorg is corrected by the blurred mask processing, has been described, the method is not limited to that, but, other methods may also be allowable if the modulation transfer function is smaller as the density area comes to the lower density area. These methods includes:

(1) a first method for achieving that the modulation transfer function in a region of image reproduction signal Sr, which corresponds to the low density region of the original image signal Sorg, is not higher than the modulation transfer function in a region of Sr, which corresponds to the high density region of Sorg; and (2) a second method for achieving that, after applying an average processing (e.g., the unsharp mask processing) to Sorg, the modulation transfer function in a region of image reproduction signal Sr, which corresponds to the low density region of the average processed Sorg, is not higher than the modulation transfer function in a region of Sr, which corresponds to the high density region of the average processed Sorg.

It is desirable to employ the second method for the purpose of image diagnosis.

Further, other image processing such as gradation processing, frequency emphasis processing, and dynamic range compression processing, may also be combined.

Further, in the present example, an example in which, as the density area comes to the lower density area, the modulation transfer function is the more attenuated, has been described above, however, the hardware of the FPD 4 may also be structured such that the modulation transfer function is attenuated corresponding to the original image signal Sorg in the low density area. For example, in the X-ray image in the low density area, the original image signals Sorg of 2 pixels are simultaneously read out and calculated the average of them. In this case, it is necessary to detect at first the low density area of the original image signal Sorg. As the detection method for this case, such a method is preferable that the low density area is previously determined by conducting, for example, pre-reading.

As described above, because the FPD 4 has very high sharpness, by distributing the characteristic to the improvement of the graininess, a well-balanced X-ray image, which has the high sharpness in the high density area and has the superior graininess property in the low density area, can be provided.

In contrast to this, in the conventional X-ray image reading system utilizing a photo-stimulable phosphor, when the sharpness in the low density area is positively attenuated as in the present invention, the sharpness is too deteriorated to provide the better image due to its low sharpness, though the graininess may be improved.

Following to the above, an example of the structure of a printer 10 to hardcopy the X-ray image will be described below.

The X-ray image information Sr obtained by the above cited image processing means 5 is outputted to a scanning type laser exposure device (which is called also a laser imager as a general name) used as an image output device such as a MR, CT, RI, etc., in the medical diagnostic field. In this example, by the X-ray image information Sr inputted into the scanning type laser exposure device, the laser beam strength is modulated, and after the conventional silver halide photographic photosensitive material or the thermal development silver halide photosensitive material is exposed thereby, a hardcopy of the X-ray image is obtained through an adequate development processing process.

In the scanning type laser exposure device, as the laser light source, a solid state laser such as a ruby laser, a YAG laser, a glass laser, etc.; a gas laser such as a He—Ne laser, an Ar ion laser, a Kr ion laser, a $CO_2$ laser, a CO laser, a He—Cd laser, a $N_2$ laser, an excimer laser, etc.; a semiconductor laser such as an InGaP laser, an AlGaAs laser, a GaAs laser, an InGaAs laser, InAsP laser, a $CdSnP_2$ laser, a GaSb laser, a GaN laser, etc.; a chemical laser; or a dyestuff laser, is listed up.

In the silver halide photographic sensitizing material used in the present invention, a colored or non-colored transparent high polymer material such as polyester, and triacetyl cellulose, polyethylene naphthalate, polycarbonate, and polynorbonene resins, is used as a support material, and an under coat layer to provide the adhesion property is coated thereon, and a high polymer layer (photosensitive layer) such as gelatine formed by dispersing silver halide particles on one surface or double surfaces of the support material, is coated further thereon.

When a photosensitive layer including silver halide particles is coated only on one surface, a gelatine layer including at need antihalation dye, antistatic agent, matting agent, can be coated on the other surface of the photosensitive layer. The thickness of a high polymer film such as gelatine in the layer can be adjusted such that the photosensitive material does not cause a strong curl due to a change of the environmental humidity or during processing in the water.

Silver halide particles are dispersed in the photosensitive layer using the above cited photosensitive materials. The silver halide particle has a composition of silver iodobromide, silver bromide, silver chloride, or silver chlorobromide, whose shape is cubic, octahedral, potato-like, spherical, rod-like or plate-like, and whose particle diameter distribution can be selected from the narrower one to the wider one corresponding to the purpose. The average particle size is preferably 0.1–1 μm when being converted into a spherical silver halide particle. In the case of a plate-like particle, the particle whose average aspect ratio is 100:1–2:1, can be used.

In this example, it is preferable to use a core/shell type particle of the multi-layer structure in which the halogen composition of the inside and surface of the silver halide particle is different from each other. As for the production method of the silver halide particle, Japanese Patent Publication Open to Public Inspection Nos. 177535/1984, 17844/1984, 35726/1985, 147727/1985, etc., can be referred to.

These silver halide particles are preferably chemically sensitized by using a hypo, selenide, telluride, and auric compound, and an iridium compound or other precious metals, and spectral sensitizers can be added at the time of production of the silver halide particles. The spectral maximum wavelength of the spectral sensitizer used for the photosensitive material is 100–1500 nm, and generally, cyanine dye or merocyanine dye are used. The structure thereof is disclosed in, for example, The theory of the Photographic Process, by C. E. K. Mees, T. H. James, on page 198–201, the third edition, (Macmillan, N.Y., 1986).

Further, it is preferable to contain a mercaptan compound containing various nitrogenous organic compounds or sulfurous atoms to suppress an increase of fogging during storage or development processing in the photosensitive layer. Further, irradiation preventing dyes can be contained in the photosensitive layer. Further, non-photosensitive silver halide particles to suppress the reflection of the external light by providing unevenness on the film surface after development processing can be contained therein.

A gelatin protective layer to protect the photosensitive layer can be coated on the upper layer of the photosensitive layer, and anti-static agents, matting agents, or sliding agents can be contained in this layer corresponding to the purpose. It is preferable to contain hardener to strengthen the film surface by bridging gelatin chain in the photosensitive layer and its protective layer.

The silver halide photosensitive material in the present invention is preferably to be developing processed by using an automatic processor, and it can be processed within the processing time (Dry to Dry) of 10 sec–210 sec. It is preferable to use dihydroxy benzene-compounds, 3-pyrazolidone compounds, or ascorbic acid compounds, described in Japanese Patent Publication Open to Public Inspection Nos. 154641/1992, and 16841/1992, in the developing solution used in the automatic processor as the developing agent. Sulfites as a preserver, hydroxides or carbonates as an alkaline agent, are used together with a buffer agent described in Japanese Patent Publication Open to Public Inspection Nos. 28708/1986, and 93439/1985. Glycol compounds are used as auxiliary agents for dissolution, and sulfide, disulfide compounds, triazine are used as silver antisludging agents. Compounds described on page 226–229 in Photographic Processing Chemistry, by F. A. Maison, published by Focal Press (1966), such as azole organic preventive agents as an organic restrainer, and karium bromide as an inorganic restrainer, can be used.

Further, organic chelate agents, and dialdehyde developing hardener can be included in the developing solution. A replenishing amount of the developing solution when developing processing is conducted, is preferably 5–15 ml/10=12 inch size paper. As a fixing solution, a fixing material commonly used in the business world, can be contained, and chelating agents, fixing hardeners, and fixing accelerators can be contained.

Silver halide photosensitive materials, described in Japanese Patent Publication Open to Public Inspection No.

311407/1997, for which wet processing as described above is not conducted, but thermal development is conducted, can be used. The photosensitive material has at least one photosensitive layer on the support material, and is a thermal development photosensitive material containing the reducing agent and binder for organic silver halide, photosensitive silver halide particles, and silver ions.

The silver halide particle of the photosensitive material has a composition of silver iodobromide, silver bromide, silver chlorobromide, or silver chloride, whose shape is cubic, octahedral, spherical, or potato-like, and whose average particle size is preferably 0.2–0.010 $\mu$m when being converted into a spherical silver halide particle.

Further, it is preferable to conduct chemical sensitizing on the silver halide particles by a hypo, selenium, and auric compounds, and to use a spectral sensitizing dye to provide color sensitivity of 400–1500 nm thereto. In the photosensitive material, it is preferable to contain an organic carboxylate or an isocyanate compound to suppress an increase of fogging during storage of the photosensitive material. For organic silver salts used in the photosensitive materials, long chain silver carboxylate having the number of carbons of 10–30, are preferable. As an example, silver behenite, silver stearate, silver oleate, silver laurate, silver caproate, silver myristate, silver palmitate, silver mareate, silver fumarate, silver tartarate, silver linolate, silver butyrate, and silver camphorate, and a mixture of these materials are listed up.

As reducing agents for organic silver salts, dihydroxybenzene compounds such as phenidones, or hydroquinones, etc., are used. In addition to this, reducing agents within wider range can be used, for example, amideoxims, azines, a combination of aliphatic series carboxylic acid aryl hydroazides and ascorbic acids, etc., can be used.

Further, it is preferable to coat a protective film on the photosensitive layer of the photosensitive material, and antistatic agents, matting agents, or slipping agents, etc., can be added to the protective film corresponding to the purpose. As these photosensitive layer and protective layer, colored or non-colored transparent high polymer material such as polyester, triacetyl cellulose, polyethylene naphthalate, polycarbonate and polynorbonene resins, on which an under coating layer to provide adhesive property is coated, is coated on the support material. It is preferable to coat a backing layer containing anti-halation dye or matting agent, and anti-static agent on the support material on which the photosensitive layer is not coated. On the photosensitive material, the image signal is exposed by using the scanning type laser exposure device, and the thermal development is conducted in the temperature range not less than 80° C. and not more than 200° C.

Next, an example in which dry photosensitive materials are used, will be described.

The X-ray image information Sr obtained by the present reading system 100 can be applied to the scanning type laser exposure device disclosed in, for example, Japanese Patent Publication Open to Public Inspection 282099/1996. In this example, a hard copy can be obtained when exposure is conducted by the high density laser beam according to the X-ray image information Dr, and transfer is conducted from a transfer layer having developing components to a receptor layer.

In the scanning type laser exposure device, as the laser light source, a solid state laser such as a ruby laser, a YAG laser, a glass laser, etc.; a gas laser such as a He—Ne laser, an Ar ion laser, a Kr ion laser, a $CO_2$ laser, a CO laser, a He—Cd laser, a $N_2$ laser, an excimer laser, etc.; a semiconductor laser such as an InGaP laser, an AlGaAs laser, a GaAs laser, an InGaAs laser, InAsP laser, a $CdSnP_2$ laser, a GaSb laser, a GaN laser, etc.; a chemical laser; or a dyestuff laser, is listed up. The wavelength of the laser beam is 400–1200 nm.

The photosensitive material for use in this system, is structured by 3 support materials. The photosensitive material is characterized in that the transfer material in which a developing component is provided on the first support material, and a peeling material having the third support material are provided facing to the transfer layer; when the high density energy light from the first support material side is used for image-wise exposure, the cohesiveness between the support material and the transfer layer of the exposure portion is decreased by the abrasion, and the transfer material is separated from and the peeling material, and the exposure portion of the transfer layer is transferred onto the peeling material; and after that, superimposed images are formed on the transfer layer of the exposure portion on the peeling material and the receptor layer side of the receptor material having the receptor layer containing chromatic component on the second support material.

The abrasion used herein means such a phenomenon that the transfer layer of the image exposure portion is not destroyed, but only the cohesiveness between the support material and the transfer layer is decreased or eliminated, or a portion of the transfer layer of the image exposure portion is thermally destroyed and splashed, or in addition to this, cracking occurs in the transfer layer of the image exposure portion.

The image formation in this case is conducted by mixing the developing component and the chromatic component during or after the latent image formation, and further, it is preferable that heating or pressing is conducted. As the heating means, a means which applies only temperature, or pressure simultaneously with temperature may be usable, like as a oven, thermal head, heat roll, hot stamp, or heat pen, etc. The developing component of the first layer is a silver source which colors by, for example, organic reducing agents, and the chromatic component of the second support material is that which colors by organic reducing agents.

As the organic reducing agent, for example, succinic acid imide, phthalic imide, 2-methyl succinic acid imide, dithiouracil, 5-methyl-5-n-pentylhydantoin, etc, are listed up. As the silver source, the silver salt of fatty carboxylic acid (for example, silver behenate, silver stearate, silver oleate, or silver laurate, etc.) is listed up.

Further, a thermal print-though thermosensitive recording method described in Japanese patent Publication Open to Public Inspection No. 188073/1997, can be used. The dye layer surface of the thermal print-through sheet faces to the receptor layer surface of the thermal print-through image receiving sheet such that these surfaces contact with each other, and by applying thermal energy corresponding to the image information to the interface between the dye layer and the receptor layer by a heat applying means such as a thermal head, or the like, the dye in the dye layer is transferred to the receptor layer.

Further, by applying predetermined thermal energy from the back side of the thermal print-through sheet after transfer by the heat applying means such as a thermal head, or the like, the unreacted dye is fixed. Concrete examples of the thermally transferable dye of the dye layer are described in, for example, Japanese patent Publication Open to Public Inspection Nos. 78893/1984, 10909394/1984, and 2398/1985. A representative example of binder resins used in the dye layer can be selected from cellulose, polyacrylic, polyvinyl alcoholic resins, or the like. As a receptor layer, resins which sublimation dyes can easily dye, are selected from, for example, polyolefine resins, polyvinyl chloride resins, or polyvinylidene resins.

Further, by utilizing a piezo electric effect or the like, fine particles of ink are imagewise jetted for image formation according to the inputted image signal, that is, an image can be outputted by a so-called inkjet process. Further, an image can be outputted by a so-called digital copier, which is of a xerography type in which the X-ray image information Sr is converted into an optical signal and an image is formed by toner.

By this structure, the graininess can be improved in the low density area of the X-ray image, and the sharpness can be maintained in its high density area.

The present invention is extremely appropriate when it is applied to a medical X-ray photographic system to obtain an X-ray image of the chest of the human body or the like.

What is claimed is:

1. A radiation image reading apparatus comprising:
    a semiconductor detector that receives radiation-photons penetrated through a subject, and performs photoelectronic converting actions to generate original radiation-image signals; and
    a processor that processes said original radiation-image signals to de-emphasize high frequency components in a low density region as compared to a high density region, and outputs processed radiation-image signals for forming a radiation image;
    wherein said low density region is a part of the radiation image corresponding to an area at which said semiconductor detector receives a relatively small amount of radiation-photons penetrated through said subject, and said high density region is another part of the radiation image corresponding to an area at which said semiconductor detector receives a relatively large amount of radiation-photons penetrated through said subject.

2. The apparatus of claim 1, wherein said processor processes said original radiation-image signals outputted by said semiconductor detector so that a modulation transfer function in said low density region is lower than another modulation transfer function in said high density region, in order to de-emphasize the sharpness in said low density region.

3. The apparatus of claim 1, wherein said processor processes said original radiation-image signals outputted by said semiconductor detector so that a modulation transfer function in a region of said processed radiation-image signals corresponding to said low density region, in said original radiation-image signals, is not higher than another modulation transfer function in a region of said processed radiation-image signals corresponding to said high density region, in said original radiation-image signals.

4. The apparatus of claim 1, wherein said processor applies an unsharp mask to said original radiation-image signals to generate unsharp mask signals, and processes said original radiation-image signals so that a modulation transfer function in a region of said processed radiation-image signals corresponding to said low density region, in said unsharp mask signals, is not higher than another modulation transfer function in a region of said processed radiation-image signals corresponding to said high density region, in said unsharp mask signals.

5. The apparatus of claim 4, wherein the unsharp mask for generating said unsharp mask signals has a modulation transfer function of not less than 0.5 when a spatial frequency is 0.1 cycle/mm, and a modulation transfer function of not greater than 0.5 when the spatial frequency is 10 cycle/mm.

6. The apparatus of claim 1, wherein said semiconductor detector converts said radiation-photons into said original radiation-image signals by receiving said radiation-photons at each of a plurality of pixels.

7. The apparatus of claim 1, wherein said processor generates unsharp mask signals corresponding to low spatial frequent components at each of a plurality of pixels of said original radiation-image signals, and processes said original radiation-image signals so as to satisfy:

$$Sr = Sorg - \alpha(Sorg - Sus)$$

where Sr represents said processed radiation-image signals, Sorg represents said original radiation-image signals, Sus represents said unsharp mask signals, and α represents an attenuation coefficient which monotonously decreases in accordance with an increase of one of Sorg and Sus.

8. The apparatus of claim 6, wherein said attenuation coefficient monotonously reduces in accordance with an increase of said unsharp mask signals.

9. The apparatus of claim 1, wherein said semiconductor detector comprises:
    a substrate;
    a plurality of electrodes fabricated at each of a plurality of pixels to receive said radiation-photons penetrated through said subject at each pixel;
    a plurality of capacitors fabricated at each of said electrodes to store electric charges generated by receiving said radiation-photons at each of said electrodes;
    a plurality of switching elements that control a reading action of said electric charges stored in said capacitors;
    a photoconductive layer fabricated to cover said switching elements, said capacitors and said electrodes; and
    a surface electrode covering said photoconductive layer so as to serve as a common electrode;
    wherein electron and hole pairs, which are generated in said photoconductive layer by said radiation-photons penetrated through said subject, are separated by an electric field with a predetermined potential applied between said surface electrode and said substrate, and said switching elements then control reading of said electric charges stored in said capacitors using said electric field.

10. The apparatus of claim 1, further comprising a memory that stores said processed radiation-image signals.

11. The apparatus of claim 1, further comprising an input device for inputting subject discrimination data pertaining to said processed radiation-image signals.

12. The apparatus of claim 1, further comprising an image forming device for forming the radiation image based on said processed radiation-image signals.

* * * * *